United States Patent [19]

Tyger et al.

[11] Patent Number: 5,106,651
[45] Date of Patent: Apr. 21, 1992

[54] METHOD FOR IMPROVING RESISTANCE TO WATER SPOTTING AND ACID ETCHING OF COATINGS BY EXPOSURE TO UV RADIATION

[75] Inventors: Wayne H. Tyger, New Kensington; Raymond F. Cornuet, Jr.; B. Keith Johnston, both of Arnold, all of Pa.

[73] Assignee: PPG Industries, Inc., Pittsburgh, Pa.

[21] Appl. No.: 658,616

[22] Filed: Feb. 21, 1991

[51] Int. Cl.⁵ .............................................. B05D 3/06
[52] U.S. Cl. ................................. 427/54.1; 427/379; 427/385.5; 427/407.1
[58] Field of Search .................. 427/54.1, 407.1, 379, 427/444, 385.5

[56] References Cited

U.S. PATENT DOCUMENTS

| | | | |
|---|---|---|---|
| Re. 25,164 | 5/1962 | Cline | 427/54.1 |
| 2,236,397 | 3/1941 | Drummond | 427/54.1 |
| 3,567,494 | 3/1971 | Fitko | 427/54.1 |
| 4,066,523 | 1/1978 | McGinniss | 204/159.15 |
| 4,069,364 | 1/1978 | Dickie et al. | 427/407.1 |
| 4,205,115 | 5/1980 | Piccirilli et al. | 428/334 |
| 4,605,465 | 8/1986 | Morgan | 427/54.1 |
| 4,634,602 | 1/1987 | Sirkoch et al. | 427/44 |
| 4,818,796 | 4/1989 | Das et al. | 525/329.5 |
| 5,068,288 | 11/1991 | Taljan et al. | 427/142 |

FOREIGN PATENT DOCUMENTS 03068475 3/1991 Japan.

Primary Examiner—Shrive Beck
Assistant Examiner—Diana L. Dudash
Attorney, Agent, or Firm—William J. Uhl

[57] ABSTRACT

A method for increasing the resistance of a coating such as a color/clear composite coating to water spotting and acid etching is disclosed. The method involves exposing the coated substrate to ultraviolet radiation after heat curing of the coating.

12 Claims, No Drawings

METHOD FOR IMPROVING RESISTANCE TO WATER SPOTTING AND ACID ETCHING OF COATINGS BY EXPOSURE TO UV RADIATION

BACKGROUND OF THE INVENTION

1. Field of the Invention

The present invention relates to a method for applying coatings, particularly color/clear composite coatings, to articles of manufacture for outdoor exposure such as motor vehicles. More particularly, the invention relates to an improved method for applying coatings to such articles in which the resultantly coated substrate is treated to improve its resistance to water spotting and acid etching.

2. Brief Description of the Prior Art

Color/clear composite coating systems involve the application of a colored or pigmented base coat to a substrate followed by the application of a transparent or clear top coat to the base coat. These composite coatings are becoming increasingly popular as original finishes for motor vehicles. The color/clear finishes have outstanding gloss and distinctness of image and the clear coat is particularly important for these properties. A serious problem associated with this type of finish is water spotting or acid etching. Water spotting is the tendency of water to permanently spot the coating when placed in direct contact with the coating. Acid etching is the tendency of acidic materials to actually etch away the clear coating when in direct contact with the coating. Because many portions of the world, particularly industrial areas, have an acidic environment, rain water becomes acidic and when left on the painted surface of the motor vehicle will cause water spotting and, if the rain water is acidic enough, will actually acid etch away a portion of the clear coat. If serious enough, the motor vehicle may have to be repainted since it is very difficult and often impossible to polish and buff out the water spotting and acid etching. The problem is also present in color coatings without a clear coat, although it is not nearly as severe as with clear coats.

The problem of water spotting and acid etching has been recognized in the industry and one approach to solve the problem is to formulate clear coat compositions with specific resinous binders which are resistant to water spotting and acid etching. Examples of such resinous binders are those described in U.S. Pat. No. 4,818,796. Although formulating clear coating compositions with specific resinous binders so as to have improved resistance to water spotting and acid etching is a solution to the problem, there are certain drawbacks associated with this approach. For example, the compositions of U.S. Pat. No. 4,818,796 have a tendency to crack when exposed for long periods outdoors, particularly in hot, humid atmospheres. Also, new clear coat compositions must go through a time consuming approval process before they will be accepted by the industry.

Therefore, it would be desirable to take formulated coating compositions which are presently approved by the industry and treat the coated substrate in a manner so as to improve its resistance to water spotting and acid etching.

SUMMARY OF THE INVENTION

In accordance with the present invention, an improved method for applying the coating to an article of manufacture intended for outdoor exposure such as a motor vehicle or a fabricated part for a motor vehicle is provided. The method comprises applying to the substrate a film-forming composition containing an active hydrogen-containing polymer and an aminoplast curing agent to form a coated article. The coated article is heated to cure the coating in a conventional manner. The improvement of the invention resides in that after heating the coated article so as to cure the coating, the coated article is exposed to an artificial source of ultraviolet radiation in an oxygen-containing atmosphere in an amount sufficient to increase the resistance of the coating to water spotting and acid etching when the coated article is subsequently exposed to natural weathering. The invention is particularly applicable to color/clear composite coatings on automobiles and trucks where the water-spotting and acid-etching problem are particularly acute.

It is of course well known in the art that testing specimens such as coated panels after coating can be exposed to artificial sources of ultraviolet radiation for the purpose of accelerated weathering testing, i.e., WEATH-ER-O-METER or Q.U.V. exposure. The present invention obviously does not apply to such articles but applies to manufactured articles having a utility other than for experimental testing.

With regard to prior publications, U.S. Pat. No. 4,066,523 to McGinniss discloses a process for applying by electrodeposition coating compositions containing pendant tertiary amine groups and pendant mercaptan groups. Also present is a photosensitizer and a bis-maleimide crosslinking agent. The coating is first partially heat cured followed by fully curing the coating by ultraviolet radiation. The process of the present invention differs from that of U.S. Pat. No. 4,066,523 in that in the present invention, the coating compositions are not particularly formulated for ultraviolet cure. The coating compositions used in the present invention contain an aminoplast curing agent which is not present in the compositions of U.S. Pat. No. 4,066,523 and the coating compositions used in the present invention are preferably free of photosensitizers. The compositions of U.S. Pat. No. 4,066,523 are formulated particularly for UV cure and there is no suggestion that UV cure improves resistance to acid etching and water spotting. Also, color/clear composite coatings and application of the coatings by non-electrophoretic means are not disclosed in the reference. In the present invention, the coating is typically applied by non-electrophoretic means.

U.S. Pat. No. 4,634,602 to Sirkoch et al discloses compositions containing a radiation sensitive compound having ethylenic unsaturation, a radiation insensitive compound having hydroxyl and epoxy groups and a curing agent which is reactive with hydroxy groups such as an aminoplast resin. The compositions can be first partially cured by exposure to ultraviolet or electron beam radiation followed by heat curing. Alternatively, the coating can be first partially heat cured followed by full cure by exposure to ultraviolet or electron beam radiation. The present invention differs from U.S. Pat. No. 4,634,602 in that the compositions used in the present invention are preferably fully heat cured rather than partially cured. Also, the coating compositions of U.S. Pat. No. 4,634,602 contain compounds which contain radiation curable ethylenic unsaturation and photoinitiators. The coatings of the present invention are preferably substantially free of radiation curable ethylenic unsaturation and photoinitiator. Although there may be some unreacted acrylic monomer and free radical polymerizable initiator, this is obviously different than purposefully added ethylenic unsaturation and photoinitiator. U.S. Pat. No. 4,634,602 does indicate that the composition can be applied as a primer and partially cured by either UV or thermal cure followed by topcoating and complete cure of primer and top coat by UV or thermal cure depending on how the primer was partially cured. However, color/clear composite coatings are not disclosed, nor is exposing the coating to ultraviolet radiation in an amount sufficient to increase the resistance of the coating to acid etching and water spotting disclosed.

DETAILED DESCRIPTION

The coating used in the practice of the invention can be straight color or pigmented coating, a clear coating or a composite color plus clear coating, which is the preferred coating. Color plus clear composite coatings comprise a colored or pigmented base coat and a clear top coat which is derived from a film-forming composition containing an active hydrogen group-containing polymer and an aminoplast curing agent. The term "active hydrogen" refers to hydrogens which, because of their position in the polymer molecule, display reactivity with the aminoplast. Preferred active hydrogens include hydrogen atoms attached to oxygen and specific examples include hydroxyl and carboxylic acid, which are most preferred.

The most suitable active hydrogen-containing polymers are acrylic polymers containing hydroxyl and preferably carboxylic acid groups and polyester polyols including hydroxyl group-containing alkyds. Also, polyurethane polyols can be employed. The preferred active hydrogen-containing polymers are acrylic polymers containing hydroxyl groups. Also, the most preferred polymers contain carboxylic acid groups.

The active hydrogen-containing acrylic polymer can be prepared from polymerizing a mixture of acrylic monomers including a monomer of the formula:

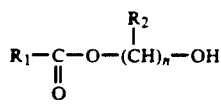

wherein $R_1$ is a polymerizable unsaturated hydrocarbon group and $R_2$ is hydrogen or a $C_1$ to $C_4$ alkyl, $n=2$ to 4, and at least one other unsaturated monomer copolymerizable therewith. Examples of hydroxyl group-containing monomers mentioned above are hydroxyalkyl esters of acrylic and methacrylic acid containing from 2 to 4 carbon atoms in the alkyl group such as hydroxyethyl acrylate, hydroxyethyl methacrylate, hydroxypropyl acrylate and hydroxypropyl methacrylate. Also, hydroxyl group-containing monomers such as the reaction products of hydroxyethyl acrylate and epsilon-caprolactone can be used. The amount of the hydroxyl group-containing monomer which is used is about 10 to 60, preferably 25 to 50 percent by weight based on total weight of all of the alpha, beta-ethylenically unsaturated monomers which are used in preparing the active hydrogen-containing acrylic polymer.

Most preferably, the active hydrogen-containing acrylic polymers will also contain carboxylic acid groups. These groups can be incorporated into the polymer by polymerizing with the other copolymerizable unsaturated monomers a polymerizable alpha, beta-ethylenically unsaturated carboxylic acid, preferably a monocarboxylic acid such as acrylic acid, methacrylic acid or crotonic acid. When the polymerizable alpha, beta-ethylenically unsaturated carboxylic acids are employed, they are used in amounts of up to 5 percent by weight, preferably from 1 to 3 percent by weight based on total weight of polymerizable alpha, beta-ethylenically unsaturated monomers.

Examples of other polymerizable alpha, beta-ethylenically unsaturated monomers which are copolymerizable with the active hydrogen group-containing monomers described above are those which do not contain hydroxyl or carboxyl groups and specifically include vinyl aromatic compounds such as styrene, vinyl toluene and 2,4-diphenyl-4-methyl-1-pentene; alkyl esters of acrylic and methacrylic acid containing from 1 to 12 carbon atoms in the alkyl groups such as ethyl methacrylate, ethyl acrylate, butyl acrylate, 2-ethylhexyl acrylate; acrylic monomers containing amido groups such as acrylamide and methacrylamide. Examples of other polymerizable alpha, beta-ethylenically unsaturated monomers are vinyl halides such as vinyl chloride and vinyl fluoride; vinyl nitriles such as acrylonitrile, methacrylonitrile; vinyl esters such as vinyl acetate and vinyl propionate. The amount of alpha, beta-ethylenically unsaturated monomer free from hydroxyl or carboxylic acid groups is from 40 to 90, preferably 50 to 75 percent by weight, based on total weight of polymerizable alpha, beta-ethylenically unsaturated monomers.

The active hydrogen-containing acrylic polymers used in the present invention can be prepared in organic solvent by free radical initiated solution polymerization techniques in which the reactive ingredients are heated in the presence of a free radical initiator in an organic solvent in which the ingredients as well as the resultant polymer are soluble. The preferred free radical initiator is t-amylperoxy compounds such as 1,1-di(t-amylperoxy)cyclohexane. Examples of other free radical initiators are azobis-(isobutyronitrile), tertiary-butyl perbenzoate, tertiary-butyl peracetate, and benzoyl peroxide. The amount of free radical initiator which is used will vary in amounts from about 1 to 10, preferably 2 to 8 percent by weight, based on weight of polymerizable alpha, beta-ethylenically unsaturated monomers.

For low molecular weight acrylic polymers, the organic solvent is a high boiling solvent, preferably one having a boiling point at atmospheric pressure of at least 150° C., preferably 160°-185° C., and the reaction is preferably conducted under refluxing conditions. Examples of suitable solvents are high boiling esters such as hexyl acetate and heptyl acetate. Examples of other solvents which can be used include ketones such as methyl amyl ketone; glycol ethers such as 2-butoxyethanol, propylene glycol monoethyl ether; alcohols such as benzyl alcohol; esters such as 2-butoxyethoxy acetate, 1-ethyl-3-ethoxy-3-propionate and aromatics such as xylene and mixtures of aromatic compounds such as those available under the trademark SOLVESSO. The amount of organic solvent which is used will range from 10 to 50, preferably from 20 to 40 percent by weight based on total weight of monomers and organic solvent.

Besides organic solution polymerization techniques, the acrylic polymers can be prepared by non-aqueous dispersion polymerization techniques or can be prepared by aqueous latex polymerization methods. However, organic solution polymerization techniques are preferred because such techniques can be used to make low molecular weight acrylic polymers which enable the formulation of high solids coating compositions.

Preferably, the acrylic copolymer will have a number average molecular weight (Mn) of 100,000 or less, preferably 2,500 to 75,000, and most preferably 2,500 to 10,000. The molecular weight is determined by gel permeation chromatography using a polystyrene standard. Therefore, what is obtained is a polystyrene number. However, for the purposes of this invention, the polystyrene is considered to be the molecular weight.

To form thermosetting or heat-curable compositions, the active hydrogen-containing polymers described above are combined with an aminoplast curing agent which is reactive with the active hydrogens in the polymers. Aminoplast resins are aldehyde condensation products of amines or amides with aldehydes. Examples of suitable amines or amides are melamine, benzoguanamine, urea and similar compounds. Generally, the aldehyde employed is formaldehyde, although products can be made from other aldehydes such as acetaldehyde and furfuryl. The condensation products contain methylol groups or similar alkylol groups depending upon the particular aldehyde employed. Preferably, these methylol groups are etherified by reaction with an alcohol. Various alcohols employed include monohydric alcohols containing from 1 to 4 carbon atoms such as methanol, ethanol, isopropanol and n-butanol, with methanol being preferred. Aminoplasts are commercially available from American Cyanamid Company under the trademark CYMEL and from Monsanto Chemical Company under the trademark RESIMINE. The preferred aminoplast is methylated melamine-formaldehyde condensate.

The thermosetting clear coat compositions typically contain from 40 to 80 percent by weight of the active hydrogen-containing polymer and from 20 to 60, preferably 30 to 50 percent by weight of the aminoplast curing agent. The percentages by weight are based on total weight of resin solids in the clear coat composition.

To promote curing of the thermosetting clear coating compositions, the compositions will optionally contain a curing catalyst to facilitate heat curing of the active hydrogens and the aminoplast curing agent. Examples of catalyst include acidic material such as acid phosphates such as phenyl acid phosphate; sulfonic acids such as para-toluene sulfonic acid and dodecylbenzene sulfonic acid. The amount of catalyst present in the compositions is typically from 0.2 to 5 percent by weight based on weight of resin solids.

In addition to the catalyst, the compositions will also usually contain an ultraviolet (UV) light stabilizer and/or a UV light absorber. Examples of suitable UV light stabilizers and absorbers include hindered amines and substituted benzotriazoles and benzophenones available from Ciba-Geigy Corporation under the trademark TINUVIN and they typically are present in amounts of about 0 to 5 percent based on weight of resin solids.

Somewhat surprisingly it has been found that the presence of the UV light stabilizer and absorber does not inhibit the effect that subsequent exposure to ultraviolet radiation has on the cured clear coats, i.e., enhancing their resistance to water spotting and acid etching. It would be expected that the UV light stabilizer and absorber would interfere with the ultraviolet radiation.

In addition to catalyst and UV light stabilizer and absorber, optional ingredients such as adjuvant hydroxy-containing polymers, fillers, plasticizers, reactive diluents, anti-oxidants, flow control agents and other formulating additives well known in the art can be employed if desired. These materials would generally constitute up to 30 percent by weight of the composition based on total weight of resin solids.

The clear coating compositions of the invention also comprise an organic solvent and/or a diluent. Examples of organic solvents include the solvents which are used in the preparation of the active hydrogen-containing polymer. Additional organic solvents can also be used in the composition. Examples of other organic solvents would be esters such as n-butyl acetate and ethyl acetate, and alcohols containing from 2 to 4 carbon atoms such as ethanol and butanol. Examples of diluent would be organic diluents used for non-aqueous dispersion polymerization and would include aliphatic hydrocarbons such as mineral spirits and naphtha. The diluent could also be water when the clear coating composition was based on an aqueous latex polymer.

The compositions of the present invention can be low solids waterborne or non-aqueous dispersion compositions or medium solids organic solvent-based compositions. Preferably, the composition is a high resin solids coating composition, that is, coating composition having resin solids content of at least 50 and usually from 50 to 75 percent by weight, with the solids being determined by heating at 110° C. for 60 minutes. The ingredients are typically mixed together with low shear mixing and then with a solvent or diluent if necessary to get the proper viscosity for coating applications, that is, a No. 4 Ford cup viscosity of 15 to 28 seconds.

The colored or pigmented coating compositions which are used in the method of the invention can be those based on organic solvent or diluent or on aqueous-based systems. Examples of suitable organic solvent or diluent-based base coat compositions would be those employing the active hydrogen-containing polymers and aminoplast curing agents described above but additionally containing coloring pigment. The pigment may be any of the conventional types comprising, for example, iron oxide, lead oxide, strontium chromate, carbon black, coal dust, titanium dioxide, talc, barium sulfate, as well as the color pigments such as cadmium yellow, cadmium red, chromium yellow, phthalocyanine blue, toluidine red, and the metallic pigments such as aluminum flake and metal oxide encapsulated mica. The pigment content of the base coating composition is expressed as a pigment-to-resin weight ratio and is usually within the range of 0.05 to 0.25:1.

Besides organic solvent or diluent-based coating compositions, aqueous-based base coat compositions can also be used. Examples of such aqueous-based compositions are described in U.S. Pat. No. 4,719,132; 4,403,003 and European Application 90109213.0.

The coating of the present invention is applied to the substrate, i.e., an article of manufacture intended for outdoor exposure such as a motor vehicle or a fabricated part for a motor vehicle such as a hood or a trunk deck using conventional methods of application such as spray coating including electrostatic spray coating. For color plus clear composite coating, the base coating is applied first to the substrate and the clear coating is then applied over the base coat preferably via a wet-on-wet technique where the base coat is not cured prior to application of the clear coat. Typically, the base coat is given a flash for 1 to 10 minutes at ambient conditions prior to the application of the clear coating composition. Alternately, the base coating composition can be first applied and cured followed by the application and subsequent curing of the clear coat.

The clear coating composition, or in the case of a wet-on-wet application the clear and base coating compositions, are then cured by heating, typically by heating at a temperature of 110°–150° C., preferably 120°–135° C., for about 15 to 30 minutes. The degree of cure can be determined by measuring the hardness and the solvent resistance of the cured clear coat. Typically, the Tukon hardness determined by ASTM E-84 will be at least 5 and preferably in the range of 6 to 10. The solvent resistance can be determined by the resistance to xylene. Specifically, solvent resistance is determined by taking a xylene-saturated cloth and rubbing across the surface of the clear coat with normal hand pressure back and forth (double rub) until the clear coat is degraded. A good solvent resistance is obtained if a coating withstands 50 double rubs without degradation.

The film thickness of the coating is typically from 0.5 to 3 mils. For composite color plus clear coatings, the film thickness of the clear coat is typically from 1 to 3 mils and the base coat from about 0.5 to 2 mils.

After the composite coating has been cured by heating as described above, it is subsequently exposed to an artificial source of ultraviolet radiation in an oxygen-containing atmosphere such as air. Typically, the exposure can be accomplished by positioning a group of ultraviolet curing lamps on the end of a paint line just after the curing ovens. However, it is not believed the time between heat curing and exposure to ultraviolet radiation is critical. The ultraviolet light source could be positioned in the end portion of the heat curing oven. At the other extreme, the coated article could be stored indefinitely before UV exposure as long as there was not significant water spotting or acid etching of the coating. For example, a coating on an automobile could be heat cured, the automobile sent to the dealer and the dealer expose the coating to an artificial source of ultraviolet radiation to increase the resistance of the coating to water spotting and acid etching.

The ultraviolet radiation utilized in the method of the invention can come from any suitable artificial source which emits ultraviolet light having a wavelength ranging from 180 to about 400 nanometers. Suitable sources of artificial ultraviolet radiation are generally known and include, for example, mercury arcs, carbon arcs, low pressure mercury lamps, medium pressure mercury lamps and high pressure mercury lamps. Preferred are ultraviolet light emitting lamps of the medium pressure mercury lamps. Such lamps usually have fused quartz envelopes and are ordinarily in the form of long tubes having an electrode at both ends. Typically, medium pressure mercury lamps employed in the method of the invention have about 200 to 300 watts per inch (across the length of the tube).

The coated substrate is passed beneath the source of ultraviolet radiation such that at least the horizontal surface of the coated substrate is exposed to the radiation. Since rain will accumulate on the horizontal surface of a motor vehicle such as a hood, roof or trunk deck, it is only necessary that the horizontal surface be exposed to the ultraviolet radiation, although vertical surfaces could of course also be exposed if desired.

The radiation source is located near the coating and the coating is exposed for a time sufficient to increase the resistance of the coating to water spotting and acid etching. Typically, the exposure will provide at least 5000, preferably from 8000 to 15,000 millijoules/cm$^2$ of radiation. Preferably, the exposure time will range from about 0.1 second up to 1 minute/linear foot. The radiation source is placed from 1 to 20, preferably 4 to 18 inches from the coating.

EXAMPLES

The following example shows coating a metal substrate via a wet-on-wet technique with a composite color/clear coating in which both the colored base coat and clear top coat contain an aminoplast curing agent. The composite coating was heated to cure both the base coat and the clear coat. Shortly after curing, the coated substrate was passed beneath an artificial source of ultraviolet radiation (medium pressure mercury lamps) in an air atmosphere. The resistance of the ultraviolet-exposed coating to acid etching and water spotting was then measured and compared to a control coating prepared in a similar manner but not given the exposure to ultraviolet radiation.

Specifically, a black base coat composition commercially available from PPG Industries, Inc. as HUBC 9517 comprising a polyester polyol and an aminoplast curing agent was spray applied to an electrocoated steel panel. The coating was applied at 25° C. in two equal thickness coats with a 90-second ambient air flash between coats to a dry film thickness of 0.8 mil. After application of the second base coat and a 90-second ambient air flash, two coats of a clear coat comprising a hydroxyl and carboxylic acid group-containing acrylic polymer (40 percent by weight hydroxy ethyl acrylate and about 2 percent methacrylic acid based on total weight of polymerizable alpha, beta-ethylenically unsaturated monomer) and an aminoplast curing agent (methylated melamine-formaldehyde condensate 50 percent by weight based on weight of resin solids) were applied wet on wet to the base coat in two equal coats with a 90-second flash between coats to a dry film thickness of 1.8–2.0 mils. The clear coating composition was available from PPG Industries, Inc. as DCT-3000. After a 5-minute ambient air flash, the composite coated panel was then heated at 250° F. (121° C.) for 30 minutes to cure the coating. The composite coating was completely cured as evidenced by its hardness and solvent resistance which were about 8 on Tukon hardness scale and 50 xylene double rubs, respectively.

Shortly after heat curing, the panel was then exposed to ultraviolet radiation by passing the coated panels on a conveyor belt beneath four (4) medium pressure mercury lamps (200 watts per inch). The lamps were maintained 4 inches above the coated panels which were passed under the lamps at a line speed of twenty (20) feet per minute. The panel was given six consecutive passes under the 4 lamps to provide about 13,000 millijoules/cm$^2$ of ultraviolet radiation per sample. The panel along with a control panel were then tested for water spotting and acid etching.

For water spotting the coated panels were exposed to an outdoor weathering in Springdale, Penn., on horizontal exposure for eight weeks. Upon completion, the panels were washed with soap and water and measured for water spotting which are the number of hazy spots on the panel. The results are reported in the Table below.

For acid etching, one drop of surfuric acid at pH=2 and one drop at pH=3 were placed on each panel and the panel baked 15 minutes at 140° F. (60° C.). The spotting and baking were repeated three times for a total of 4 cycles. The panels were washed with soap and water and evaluated for acid etching. A rating of 1 indicated no etching and a rating of 5 indicated severe etching. The results are reported in the Table below.

TABLE

| Water Spotting and Acid Etching of Color/Clear Coated Panels | | | |
|---|---|---|---|
| | | Acid Etching | |
| Coated Panel | Water Spotting | pH = 2 | pH = 3 |
| Control | 1.8 spots/in$^2$ | 5 | 3 |
| UV Exposed | 0.02 spots/in$^2$ | 2 | 1-2 |

We claim:

1. An improved method for applying a coating to an article of manufacture intended for outdoor exposure other than a testing specimen which comprises applying to the substrate a film-forming composition being essentially free of radiation polymerizable ethylenic unsaturation, containing an active hydrogen-containing polymer and an aminoplast curing agent to form a coated article and heating said coated article to cure said coating, characterized in that after heating the coated article to cure the coating to form a hard solvent-resistant coating, the coated article is exposed to an artificial source of ultraviolet radiation, in an oxygen-containing atmosphere, in an amount sufficient to increase the resistance of the coating to water spotting and acid etching when the coated article is subsequently exposed to natural weathering.

2. The method of claim 1 in which the article is a motor vehicle.

3. An improved method for applying a coating to an article of manufacture intended for outdoor exposure other than a testing specimen which comprises applying to said article a colored film-forming composition to form a base coat and applying to said base coat a clear film-forming composition containing an active hydrogen-containing polymer and an aminoplast curing agent to form a transparent top coat over the base coat to form a coated article and heating said coated article to cure said clear coat, characterized in that after heating the coated article to cure the clear top coat to form a hard solvent-resistant coating, the coated article is exposed to an artificial source of ultraviolet radiation, in an oxygen-containing atmosphere, in an amount sufficient to increase the resistance of the clear coat to water spotting and acid etching when the coated article is subsequently exposed to natural weathering.

4. The method of claim 3 in which the article is a motor vehicle or a fabricated part for a motor vehicle.

5. The method of claim 3 in which the active hydrogen-containing polymer of the clear film-forming composition is a hydroxyl group-containing acrylic polymer.

6. The method of claim 5 in which the hydroxyl group-containing acrylic polymer also contains carboxylic acid groups.

7. The method of claim 3 in which the aminoplast is a methylated melamine-formaldehyde condensate.

8. The method of claim 3 in which the aminoplast is present in the clear coating composition in amounts of from 30 to 60 percent by weight based on weight of total resin solids in said clear coating composition.

9. The method of claim 3 in which the coated article is exposed to the artificial source of ultraviolet radiation to provide at least 5000 millijoules/cm$^2$ of ultraviolet radiation.

10. The method of claim 9 in which the coated article is exposed to the artificial source of ultraviolet radiation to provide from 8000 to 15,000 millijoules/cm$^2$ of ultraviolet radiation.

11. The method of claim 3 in which the ultraviolet radiation has a wavelength ranging from 180 to about 400 nanometers.

12. The method of claim 3 in which the source of ultraviolet radiation is a medium pressure mercury lamp.

* * * * *